(12) United States Patent
Perkovich et al.

(10) Patent No.: US 7,766,092 B2
(45) Date of Patent: Aug. 3, 2010

(54) SYSTEM AND METHOD OF ASSEMBLY OF CPVC FIRE SPRINKLER SYSTEM EMPLOYING MECHANICAL COUPLINGS AND SUPPORTS

(75) Inventors: Michael P. Perkovich, Sheffield Lake, OH (US); Andrew M. Olah, Spencer, OH (US); Gary L. Johnson, Cape Charles, VA (US); Stanley J. Nerderman, Kirtland, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 739 days.

(21) Appl. No.: 11/464,919

(22) Filed: Aug. 16, 2006

(65) Prior Publication Data
US 2007/0205004 A1    Sep. 6, 2007

Related U.S. Application Data

(60) Provisional application No. 60/714,563, filed on Sep. 7, 2005.

(51) Int. Cl.
*A62C 2/00* (2006.01)
(52) U.S. Cl. .............. 169/43; 169/16; 169/37; 239/565; 239/600; 285/125.1; 285/330; 285/423; 138/103; 138/155
(58) Field of Classification Search .......... 169/5, 169/16, 37, 43, 91; 239/565, 600; 285/125.1, 285/133.11, 133.21, 197, 330, 31, 382, 423, 285/906, 331, 103; 138/99, 103, 155
See application file for complete search history.

(56) References Cited

U.S. PATENT DOCUMENTS

| | | | | |
|---|---|---|---|---|
| 3,807,777 | A * | 4/1974 | Larkin | 285/423 |
| 3,865,410 | A * | 2/1975 | Chen | 285/31 |
| 3,999,785 | A | 12/1976 | Blakeley | |
| 4,652,023 | A * | 3/1987 | Timmons | 138/99 |
| 4,712,812 | A * | 12/1987 | Weir, III | 285/906 |
| 5,104,153 | A | 4/1992 | Corcoran | |
| 5,669,449 | A | 9/1997 | Polan et al. | |
| 6,139,069 | A | 10/2000 | Radzik | |
| 6,412,824 | B2 | 7/2002 | Kunsman | |
| 6,540,261 | B1 | 4/2003 | Painter et al. | |
| 6,676,166 | B1 * | 1/2004 | Wraith et al. | 285/382 |

(Continued)

*Primary Examiner*—Steven J Ganey
(74) *Attorney, Agent, or Firm*—Joe A. Powell; Samuel B. Laferty; Thoburn T. Dunlap

(57) ABSTRACT

Fire sprinkler system comprising a network of CPVC pipe lengths in which at least some of the pipe lengths are interconnected with mechanical devices having resilient sealing members that are chemically compatible with the CPVC composition. Repairs and system modifications can be made without the use of solvent cement. In-line joints are formed with a coupling device including a pair of arcuate coupling segments having a first end, a second end, and an interior concave surface extending between the first end and the second end. A longitudinal channel extends along the concave surface. At least one mechanical fastener is operative to detachably connect the pair of coupling segments. A resilient annular seal is located within the longitudinal channel of each segment. A branching device connects a branch pipe to a main pipe through an orifice in the main pipe utilizing a saddle-like sealing member. The pipe assemblies are able to pass UL testing protocols for wet fire sprinkler systems.

17 Claims, 7 Drawing Sheets

U.S. PATENT DOCUMENTS

| | | |
|---|---|---|
| 2002/0000719 A1 | 1/2002 | Kunsman |
| 2002/0130516 A1 | 9/2002 | Sewell |
| 2005/0061925 A1 | 3/2005 | Kirschner |
| 2005/0183866 A1 | 8/2005 | Gilson |

* cited by examiner

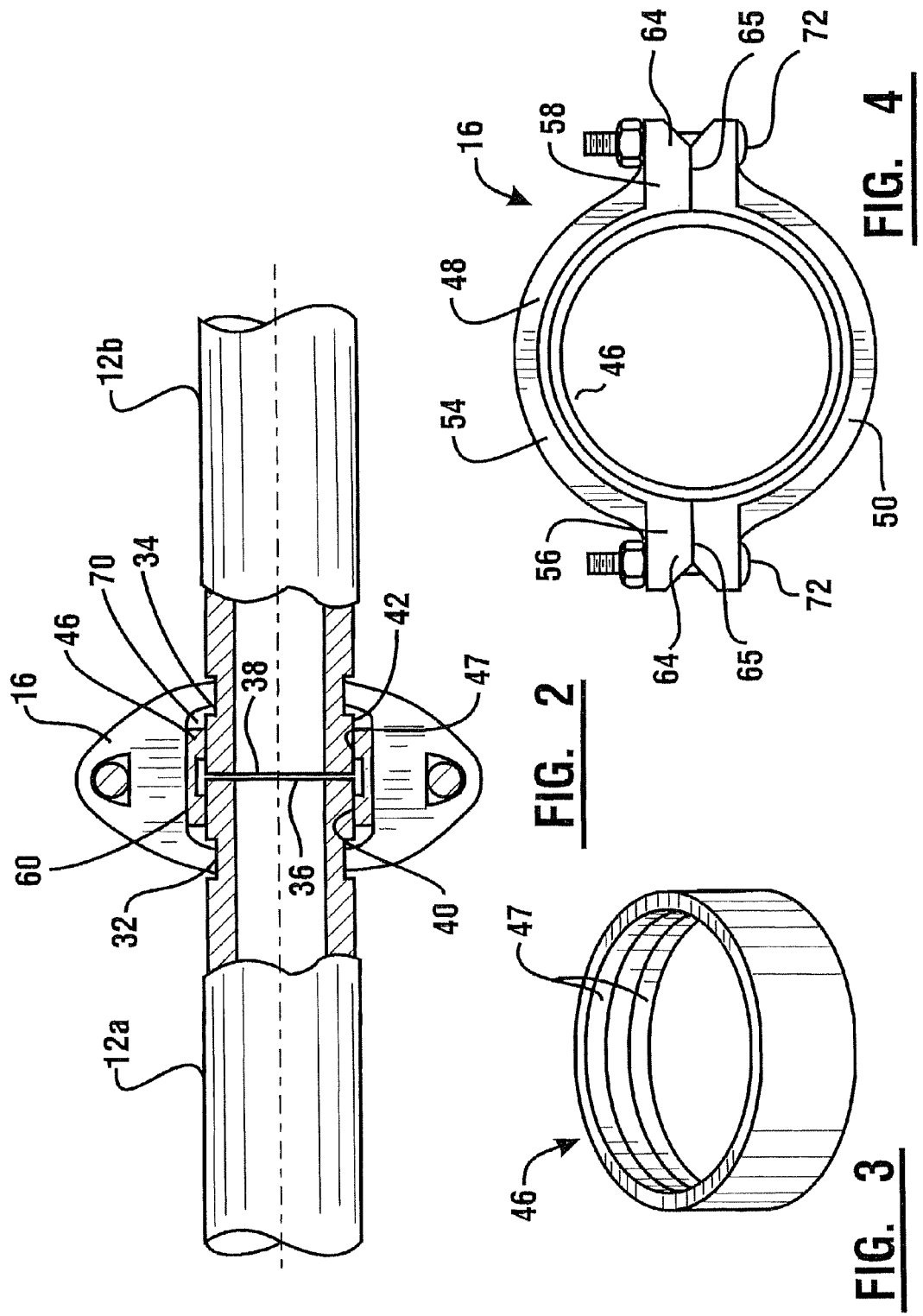

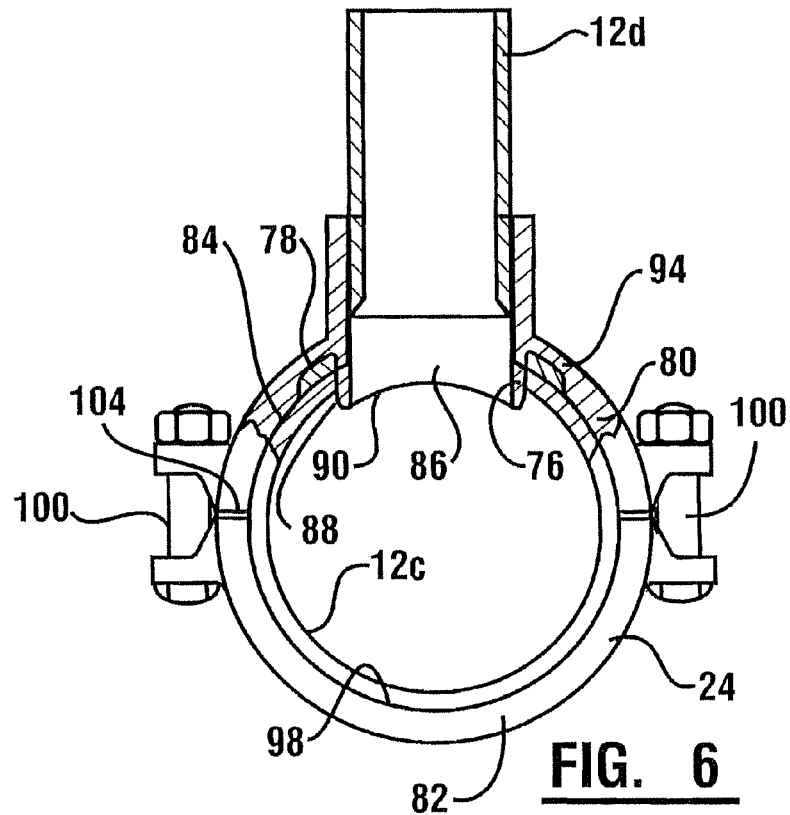
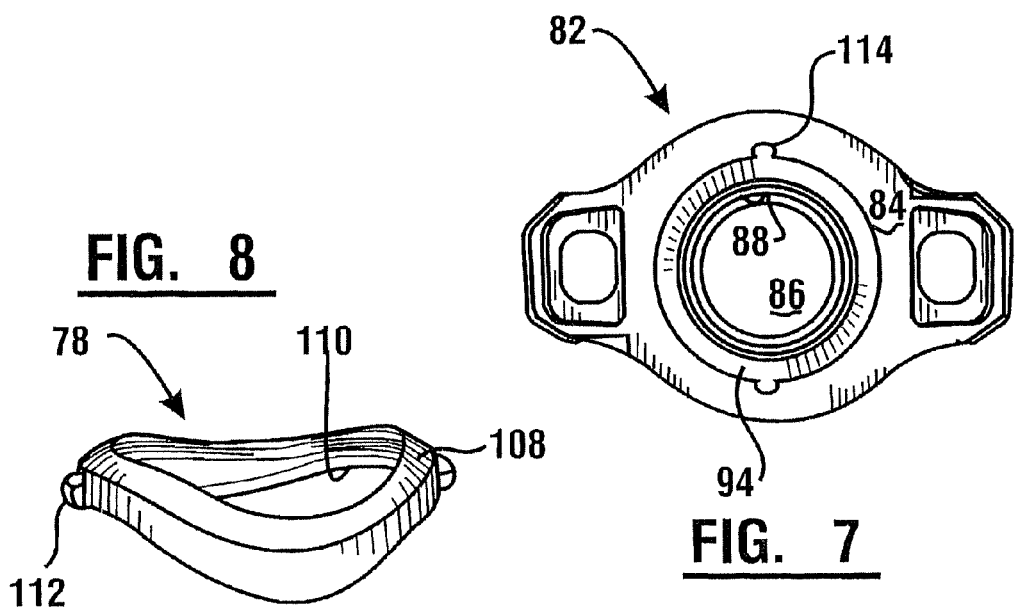

SYSTEM AND METHOD OF ASSEMBLY OF CPVC FIRE SPRINKLER SYSTEM EMPLOYING MECHANICAL COUPLINGS AND SUPPORTS

CROSS-REFERENCE TO RELATED APPLICATION

This application claims benefit pursuant to 35 U.S.C. §119(e) of Provisional Application No. 60/714,563 filed on Sep. 7, 2005.

FIELD OF THE INVENTION

The invention relates generally to fire sprinkler systems comprising CPVC pipes. An exemplary embodiment provides for mechanical interconnection of pipe lengths without the use of solvent cement and the utilization of resilient sealing members chemically compatible with the CPVC composition.

BACKGROUND OF THE INVENTION

Many buildings are required by code to have fire suppression sprinkler systems. Further, residential structures are increasingly being provided with fire suppression systems. CPVC piping systems are ideally suited for fire sprinkler system applications because of their resistance to corrosion, the lightness of material, ease of installation, and other desirable properties.

Under current standards, in-line coupling of abutting CPVC pipe sections is accomplished by use of solvent cement techniques to form a permanent bond therebetween. Such techniques require sufficient time for the solvent cement to cure. Furthermore, at times it may become necessary to make modifications or repairs to existing CPVC fire sprinkler systems. The use of solvent cement demands that the modification to the pipe network be accomplished in a generally dry environment.

In use, fire sprinkler systems are often under continuous water pressure. In prior systems, for a system modification or repair, the targeted sprinkler section must be removed from service and drained. The new CPVC pipe sections must be connected into the system adhered by solvent cement which requires an applicable cure time. Thereafter, the system is brought back online and tested. During this process, which may extend over 24 hours or longer, at least a portion of the fire sprinkler system is out of service, requiring an alternate fire watch. Thus, there exists a need to provide a method to join CPVC piping which eliminates the down time associated with prior joining processes.

Use of the solvent cement creates an irreversible pipe connection. Thus, misalignment or other adverse conditions cannot be readily corrected. Further, some piping systems, such as piping used in some food preparation systems, require frequent disassembly for cleaning. Thus, there exists a need in the art for a CPVC piping system that joins pipe segments in a releasable manner.

Other piping systems such as those using metal pipes or plastic material such as PVC, may utilize mechanical couplings with grooved or rolled pipes. Some mechanical couplings employ an annular resilient sealing member to engage the closely abutting pipe ends. Commonly, the sealing members are formed of elastomeric compositions employing plasticizers or other agents. Lubricants are also commonly applied for ease of installation. However, such prior techniques cannot readily be transferred for use with CPVC piping. The CPVC piping may have compatibility issues with the plasticizers or lubricants which could cause stress cracks in the pipe material.

In PVC piping, a method of grooving the pipe near the cut end is called "rolled grooving". In rolled grooving, material is pressed inwardly to form a circumferential depression on the outer surface. The displaced material in this process effectively reduces the inner diameter of the pipe. The reduced inner diameter affects fluid flow. Also, the character and properties of CPVC does not readily lend itself to a rolled grooving process.

In some other grooving processes, pipe wall material is removed by a blade or other cutting implement. For example, grooving metal conduits may be accomplished with a cutting tool. However, the prevalent teaching with respect to CPVC piping is that CPVC should not be grooved. CPVC fire sprinkler systems have to meet stringent UL and other standards. Because wall thickness is decreased during a cutting or grooving process, grooving CPVC pipe has been discouraged to prevent weakening of the pipe wall. Thus, prior pipe system processing and sealing methods are not readily adapted to CPVC piping systems. There exists a need for methods and testing procedures for a system employing grooved CPVC piping including a seal compatibility protocol.

Further, mechanical couplings often rely on compression forces to provide a sealing engagement between the pipes and the sealing member. The compression force applied to CPVC pipe must not exceed predetermined limits. Thus, to employ mechanical compression-type fittings with CPVC systems, there exists a need for a compression limiting mechanism.

Other desired configurations or modifications of a CPVC pipe network may include branched connections from a first pipe line to a perpendicular pipe line. In the art, a cut-in to an existing CPVC fire sprinkler system is made by shutting down the system and draining. An appropriate socket style tee fitting is used in combination with socket unions, grooved coupling adapters, and flanges. The fitting is adhered to the cut pipe ends using solvent cement. Care must be taken to follow cut-in cure schedules for the solvent cement. Similar to in-line coupling, the process requires considerable down time of the sprinkler system as well as an alternate fire watch method. Thus, there exists a need in the art for cut-in fittings and procedures that significantly reduce downtime of the sprinkler system, while still providing a system that meets stringent fire protection standards.

If mechanical couplings and fittings are to be used with CPVC pipe systems, such items must be utilized in ways that accommodate the properties of the CPVC piping. Compression and support requirements of the CPVC material must be met. Thus, there exists a need for mechanical fixtures that are compatible with the properties of CPVC piping.

Also, as discussed above, mechanical fittings have a major drawback in that elastomeric sealing members are often made of compositions comprising plasticizers and other agents that can degrade or impair performance of CPVC piping. Thus, there exists a need to provide a compatibility protocol with the use of mechanical fittings with CPVC piping.

Further, certain fire testing standards have been developed that are specific to plastic piping systems. Incorporation of mechanical fittings and adapters into such systems requires that the hybrid system meet certain performance standards. Thus, there exists a need for a plastic/mechanical system to perform in accordance with accepted fire standards. Also, introduction of resilient members to a plastic system requires that the CPVC pipe be subjected to new criteria of performance related to environmental stress crack resistance.

There exists a need for methods and devices for providing grooved CPVC piping. Further, there exists a need in the art for an apparatus operative to provide precise drilling of CPVC pipe for direct cut-in.

Fire sprinkler systems often use vertical risers to feed branches of the distribution system. Often, metallic pipe is used for the risers that feed into the fire sprinkler system. The problem is that CPVC cannot be used in riser applications due to the need for adequate support of CPVC piping without excessive compression of the material. Until now, the maximum diameter CPVC pipe used in fire sprinkler systems is about 2". Thus, there exists a need for larger pipe diameters (up to 4") with a clamping mechanism to allow the use of greater diameter pipes as the vertical risers.

SUMMARY OF THE INVENTION

In an exemplary embodiment, a system comprises a plurality of fluid pipe lengths in fluid communication. The pipe lengths are formed of a chlorinated polyvinyl chloride ("CPVC") composition. The terms "CPVC composition" and "CPVC pipe" as used herein means that the CPVC composition and CPVC pipe has a continuous phase of CPVC polymer, that is more than 50% by volume of the polymer components is CPVC, preferably more than 70% and more preferably more than 80%. Other polymers can be combined with the CPVC polymer for improving impact resistance, flow enhancers, or other properties, but these other polymers are used in smaller amounts, normally from about 5-15 percent by weight.

In the exemplary system, a first type of mechanical fixture comprises a coupling device to sealingly engage a pair of pipe lengths in close end to end relationship without the use of solvent cement. Each pipe length has an annular groove formed in the pipe wall a predetermined distance from its end. On each pipe segment, the pipe wall between the end and the groove acts as a sealing surface. The coupling device includes a resilient annular seal comprised of a material chemically compatible with the CPVC composition which engages with the sealing surfaces.

A second exemplary type of mechanical fixture comprises a branching device to sealingly engage a main pipe length and a branch pipe length in close perpendicular relationship at a branch location without the use of solvent cement. The branch pipe communicates with the main pipe through an orifice in the main pipe. The branching device includes a resilient sealing member comprised of a material chemically compatible with the CPVC composition. A sealing surface of the resilient sealing member is engaged with the main pipe length in a sealing area immediately about the orifice.

In an exemplary embodiment, when assembled, the coupling device and the at least one pair of pipe lengths comprise a first pipe fitting assembly, wherein the first pipe fitting assembly is operative to pass a first predetermined testing protocol. When assembled, the branching device, the main pipe length, and the branch pipe length comprise a second pipe fitting assembly, wherein the second pipe fitting assembly is operative to pass a second predetermined testing protocol.

In an exemplary embodiment, the system includes at least one vertical riser formed of a CPVC composition. The system further includes a third type of mechanical fixture comprising a support device operative to supportingly engage the at least one vertical riser. The support device comprises a pair of substantially identical band elements each operative to embrace the wall of the riser throughout nearly 180°. Each band element includes an arcuate section, a flange, and an arm extension. When assembled, a flange surface and an arm extension surface of opposed band elements operate as a compression-limiting mechanism to prevent over-compression of the CPVC riser.

In an exemplary embodiment, a method is provided for forming a system of CPVC pipe lengths in fluid flow communication. The method includes reversibly sealingly engaging at least one pair of pipe lengths in close end to end relationship without the use of solvent cement using a first type of mechanical fixture; and reversibly sealingly engaging at least one main pipe length in close perpendicular relationship with at least one branch pipe length at a branch location without the use of solvent cement using a second type of mechanical fixture.

In an exemplary embodiment, there is provided a system comprising a plurality of CPVC pipe lengths in flow communication, wherein at least a pair of CPVC pipe lengths are reversibly connected in close end to end relationship via a first type of mechanical fixture, and at least one CPVC main pipe length is reversibly connected in perpendicular relationship with a CPVC branch pipe length via a second type of mechanical fixture. The exemplary system includes a plurality of fire sprinkler heads in flow communication with the plurality of pipe lengths.

In an exemplary embodiment, there is provided a method comprising forming pipe conduits of an initial CPVC composition for use in fire sprinkler systems; forming first resilient sealing members comprising a first material chemically compatible with the initial CPVC composition for use with mechanical fixtures for connecting the pipe conduits; and identifying the first resilient sealing members as acceptable for use with the pipe conduits.

The exemplary method further comprises forming modified pipe conduits comprising a modified CPVC composition for use in fire sprinkler systems; forming second resilient sealing members comprising a second material chemically compatible with the modified CPVC composition for use with mechanical fixtures for connecting the modified pipe conduits; and identifying the second resilient sealing members as acceptable for use with the modified pipe conduits.

In an exemplary embodiment, there is provided a method comprising taking a region of a fire sprinkler system off-line, wherein the fire sprinkler system comprises a network of existing pipe lengths comprising CPVC; modifying the fire sprinkler system by connecting at least one additional pipe length comprising CPVC in fluid flow communication with at least a portion of an existing pipe length using at least one mechanical fixture; and returning the region of the fire sprinkler system to an on-line condition.

In an exemplary method, the fire sprinkler system is modified by square cutting the existing pipe length to remove the section to be replaced and to provide at least a first pipe end; cutting an annular groove in the pipe wall of the existing pipe length a predetermined distance form the pipe end; providing a second pipe length having an annular groove in the pipe wall a predetermined distance from an end thereof; and sealingly engaging the existing pipe length and the second pipe length in close end to end relationship with the at least one mechanical fixture, wherein the at least one mechanical fixture is a coupling device.

In another exemplary method, the fire sprinkler system is modified by cutting an orifice in a main pipe length at a branch location; encasing the main pipe length with the at least one mechanical fixture at the branch location, wherein the mechanical fixture is a branching device operative to sealingly engage the main pipe length about the orifice; and receiving a branch pipe length into an outlet opening in the mechanical branching fixture, wherein the branch pipe length is disposed substantially perpendicularly to the main pipe length.

It is, therefore an object of an exemplary embodiment to provide a fire sprinkler system utilizing CPVC piping wherein modifications and/or repairs can be made to the system without the use of solvent cement and its associated cure time.

It is also an object of an exemplary embodiment to provide a method to ensure compatibility between CPVC pipe lengths and the resilient sealing members employed in mechanical fixtures.

It is also an object of an exemplary embodiment to provide CPVC pipe and fitting assemblies capable of passing stringent testing protocols of certified testing authorities such as Underwriters Laboratories Inc. (UL).

It is also an object of an exemplary embodiment to provide a method for in-line joining of CPVC pipe lengths using grooved pipes and a mechanical coupling device.

It is also an object of an exemplary embodiment to provide a method for forming a branch line in an existing fire sprinkler system utilizing a mechanical branching device.

These, as well as other objects of exemplary embodiments will become apparent upon a consideration of the following detailed description and drawings.

BRIEF DESCRIPTION OF THE DRAWINGS

The foregoing summary, as well as the following detailed description of exemplary embodiments, will be better understood when read in conjunction with the appended drawings. For the purpose of illustrating the invention, there is shown in the drawings certain exemplary embodiments. It should be understood, however, that the invention is not limited to the precise arrangements and instrumentalities shown. In the drawings:

FIG. 2 is a front view, partly in section, of a pair of pipe lengths joined end-to-end via a first type of mechanical fixture;

FIG. 3 is a perspective view of a seal member for use in the first type of mechanical fixture;

FIG. 4 is a side view of a pipe length and mechanical fixture assembly;

FIG. 6 is a side view, partly in section, of a main pipe length and a branch pipe length joined via a second type of mechanical fixture;

FIG. 7 is a bottom view of a first arcuate section of a branching device;

FIG. 8 is a sealing member for use in the second type of mechanical fixture;

DETAILED DESCRIPTION OF THE INVENTION

Figure 1:
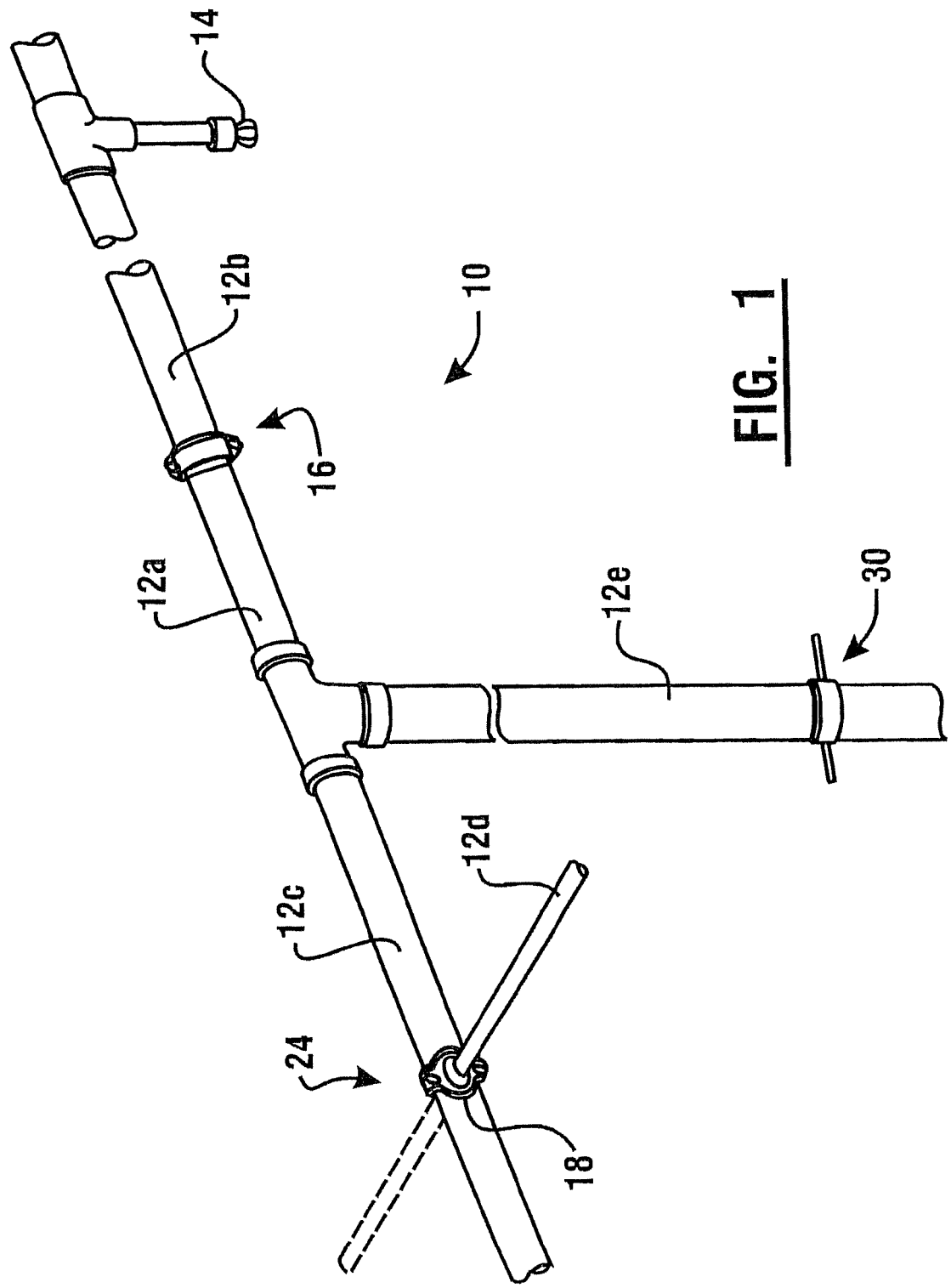
FIG. 1 is a schematic representation of an exemplary fire sprinkler system comprising CPVC pipe lengths and mechanical fixtures.

With respect to FIG. 1, in an exemplary embodiment, a portion of fire sprinkler system, generally indicated includes a network of plastic pipe lengths 12a, 12b, 12c, 12d, 12e which are formed of chlorinated polyvinyl chloride (CPVC). The network of pipes are in flow communication with a plurality of fire sprinkler heads 14. The preferred type of CPVC resin is sold under the BLAZEMASTER7 brand name. An exemplary CPVC composition has physical and thermal characteristics as follows:

| Property | BLAZEMASTER Brand CPVC | ASTM |
|---|---|---|
| Specific Gravity, "Sp. Gr." | 1.55 | D792 |
| IZOD Impact Strength (ft. lbs./inch notched) | 1.5 | D256A |
| Modulus of Elasticity, @ 73EF psi, "E" | $4.23 \times 10^5$ | D638 |
| Compressive Strength, psi, "o" | 9,600 | D695 |
| Poisson's Ratio, "O" | .35-.38 | — |
| Working Stress @ 73EF, psi, "S" | 2,000 | D1598 |
| Hazen Williams Factor "C" | 150 | — |
| Coefficient of Linear Expansion, in/(in E F), "e" | $3.4 \times 10^{-5}$ | D696 |
| Thermal Conductivity, BTU/hr/ft²/EF/in, "k" | 0.95 | D177 |
| Flash Ignition Temperature, EF | 900 | D1929 |
| Limiting Oxygen Index, "LOI" | %60 | D2863 |
| Electrical Conductivity | Non Conductor | — |
| Extrusion Temperature | 414-425 EF (approx.) | N/A |
| Heat Distortion Temperature, EF | 217 | — |

In an exemplary embodiment, pipe lengths 12a, 12b may be joined in close abutting end-to-end relationship to form in-line joints. In prior systems, in-line joints between CPVC pipe lengths are formed using a coupler or socket extending between the two pipe lengths and adhered to each pipe section via solvent cement. As illustrated, in this exemplary embodiment, a first type of mechanical fixture or coupling device 16 sealingly engages pipe lengths 12a, 12b in close abutting end to end relationship. The use of a coupling device 16 eliminates the need for solvent cement in this joint. Mechanical coupling fixtures are known for use in joining metal to metal grooved end pipes. However, concerns about diminished wall thickness, gasket compatibility, and over-compression of pipes have deterred the use of conventional mechanical couplings with CPVC piping systems.

Mechanical fixtures are also known to be used to transition between metal pipes and CPVC pipes using CPVC grooved adapters. The adapter is adhered to the CPVC piping via solvent cement. Heretofore, such mechanical fixtures have not been used to join a pair of CPVC pipe segments. The known grooved adapters are molded to their final shape, a process very different from grooving an already formed pipe as will be discussed in greater detail below.

In an exemplary embodiment, a main pipe length 12c may be joined with a branch pipe length 12d at a branch location 18 to form a tee-branch (T-branch). An additional branch pipe (shown in phantom in FIG. 1) may be used to form a cross-branch (X-branch). A second type of mechanical fixture or branching device 24 is utilized in a T-branch wherein a cut-in orifice is made directly into the pipe wall of main pipe length 12c. A modified second mechanical fixture (not shown in this view) may be utilized to form an X-branch wherein a second orifice is cut in the pipe wall of main pipe length 12c diametrically opposed to the first orifice, as will be explained in further detail below.

Also, in the exemplary embodiment, CPVC piping is utilized for the vertical riser 12e. Use of CPVC piping for vertical risers presents challenges not encountered by metal risers. In the exemplary embodiment, a third type of mechanical fixture or support device 30 is utilized to support the riser.

As shown in FIG. 2, the pipe lengths 12a, 12b each include an annular external groove 32, 34 axially spaced from respective ends 36, 38 of the pipe lengths 12a, 12b. Pipe length 12a includes an annular sealing surface portion 40 disposed between groove 32 and end 36. Likewise, pipe length 12b includes an annular sealing surface portion 42 between groove 34 and pipe end 38.

As best shown in FIGS. 3 and 4, coupling device 16 includes an annular resilient sealing member 46 that in the operative position sealingly engages the annular sealing surface portions 40, 42. The material from which seal 46 is formed must be compatible with the CPVC composition to avoid degradation or the formation of stress cracks in the pipe. In an exemplary embodiment, sealing member 46 may include a bifurcated internal sealing surface 47.

Figure 5:
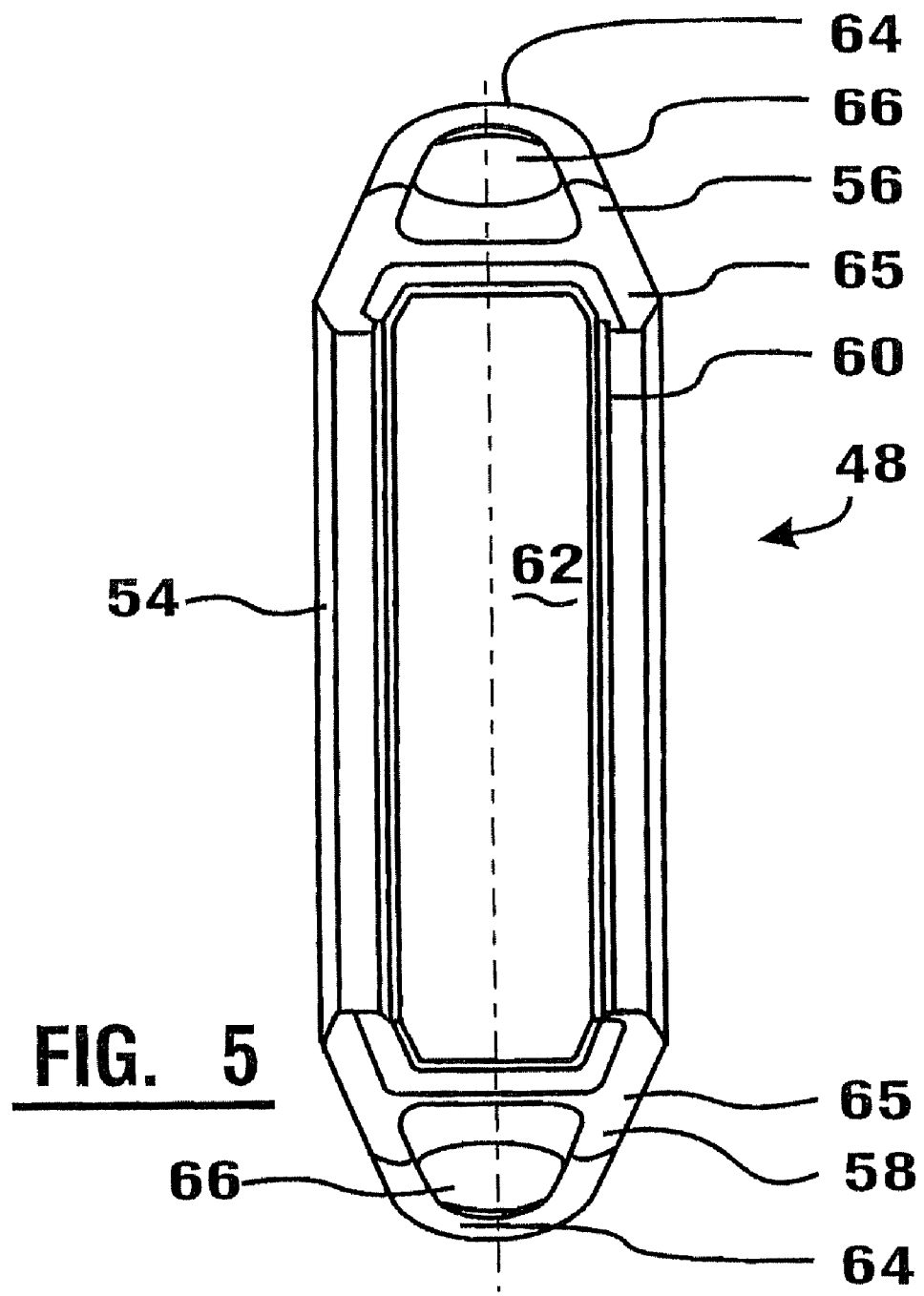
FIG. 5 is a bottom view of a coupling segment of a coupling device.

With reference to FIGS. 4 and 5, in this exemplary embodiment, coupling device 16 includes a pair of coupling segments 48, 50 that may be of substantially identical construction. Therefore, for simplicity, only the construction of segment 48 will be described in detail. Coupling segment 48 comprises an arcuate body 54 having a first end 56, a second end 58, and an interior concave surface 60 extending between the first end and the second end. A longitudinal channel 62 extends along the concave surface 60 from first end 56 to second end 58. The longitudinal channel 62 is designed to receive the sealing member 46. In this exemplary embodiment, a flange 64 extends from each end 56, 58 and each flange has a fastener hole 66 therethrough.

When the coupling device 16 is in an assembled condition, the first and second ends of one of the coupling segments are presented to the respective first and second ends of the other coupling segment. Seal 46 is engaged in an interior circumferential region 70 which includes the longitudinal channels 62 and which is bounded by the interior concave surfaces 60 (shown in FIG. 2). In this exemplary embodiment, a pair of mechanical fasteners 72 are utilized to connect the pair of coupling segments. Each flange 64 includes a generally planar surface 65 adapted to abut a corresponding surface on the other coupling segment. The engagement of these surfaces provide a means to limit compression forces exerted on the pipe lengths 12a, 12b. In the exemplary embodiment, the arcuate body 54 is generally manufactured from ductile iron, although in other embodiments other materials may be used.

When assembled, the coupling device and the pair of pipe lengths comprise a first pipe fitting assembly that is operative to pass a testing protocol as will be described in greater detail below.

With reference again to FIG. 1, in the exemplary embodiment, the second type of mechanical fixture or branching device 24 is employed for cut-in tee (T) connections. In an alternate embodiment, a modified branching device is utilized for cut-in cross (X) connections.

As illustrated in FIG. 6, branching device 24 is adapted for use with a main pipe length 12c having a cut-in orifice 76 to enable fluid flow communication between main pipe length 12c and branch pipe 12d. Orifice 76 is round, i.e., the projection of a circle on the pipe wall. Main pipe length 12c and branch pipe length 12d are disposed so that their longitudinal axes are in perpendicular relationship.

Branching device 24 includes a resilient sealing member 78 comprised of a material chemically compatible with the CPVC composition of which the pipe lengths 12 are formed. The resilient sealing member 78 may be formed of the same material as annular seal 46, or they may be formed of different material, so long as each is compatible with the CPVC.

With reference to FIGS. 6 and 7, branching device 24 includes first and second arcuate sections 80, 82, respectively. First arcuate section 80 includes a concave saddle surface 84 generally corresponding to the outer circumference of main pipe length 12c. A branch pipe opening 86 is surrounded by a spigot wall 88. Exemplary spigot wall 88 includes a contoured lip 90 adapted to generally correspond to the curvature of orifice 76. A sealing recess 94, extending in the saddle surface 84, encircles the spigot wall 88. The sealing recess 94 is adapted to generally conform to the curvature of the outer diameter of main pipe length 12c. The first arcuate section 80 embraces the outer wall of the main pipe length 12c throughout substantially 180 E and reinforces the pipe length at the location of orifice 76.

With reference to FIG. 6, second arcuate section 82 includes an interior concave surface 98 that is generally adapted to conform to the circumference of main pipe length 12c. When the branching device 24 is assembled, sealing member 78 is seated in the sealing recess 94. In this embodiment, a pair of mechanical fasteners 100 is utilized to join the first and second arcuate sections 80, 82. Each arcuate section 80, 82 includes a substantially planar region 104 adapted to abut a corresponding planar region on the other opposed arcuate section. These regions serve as a compression-limiting device when main pipe length 12c is encased in branching device 24.

With reference to FIG. 8, resilient sealing member 78 in the undeformed condition comprises a saddle-shaped body 106 having a central opening therethrough. A first surface 108 is contoured to generally conform to the shape of the closed end of sealing recess 94. An opposed sealing surface 110 is contoured to conform to the contour of outer pipe wall of main pipe length 12c. In this exemplary embodiment, resilient sealing member 78 includes two opposed key projections 112. Key projections 112 are adapted to cooperate with a key recesses 114 of sealing recess 94 to facilitate properly orienting the resilient sealing member within the sealing recess 94. In the assembled condition the resilient sealing member engages the outer pipe wall and is compressed to form a fluid tight annular seal in surrounding relation of orifice 76. When assembled, the branching device, the main pipe length, and the branch pipe length comprise a second pipe fitting assembly that is operative to pass a testing protocol as described below.

In an alternate exemplary embodiment, illustrated in phantom in FIG. 1, a modified branching device may be utilized to form a cross-branch. Two arcuate sections 80 and two resilient sealing members 78 are utilized to encase a main pipe length having diametrically opposed orifices formed therein.

Figure 9:
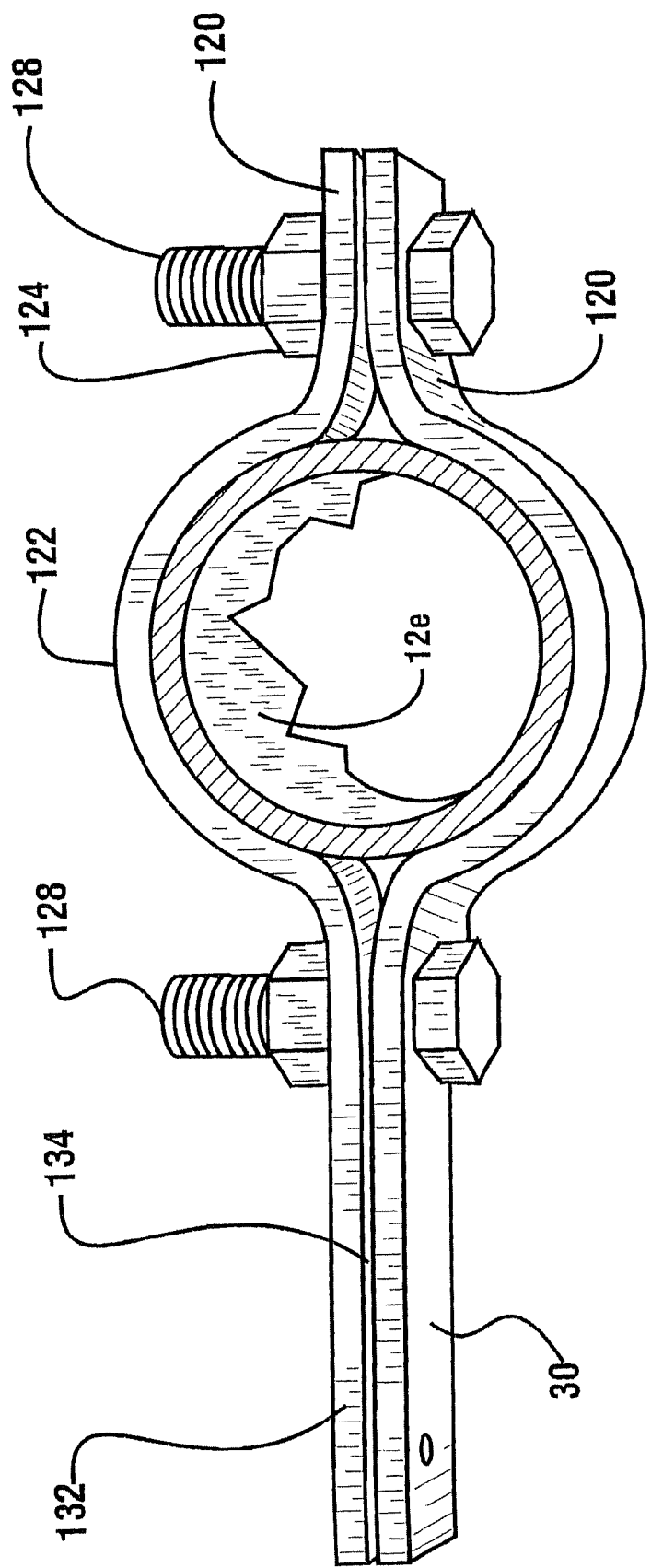
FIG. 9 is a top view, partly in section of a riser supported by a third type of mechanical fixture.
Figures 10, 11:
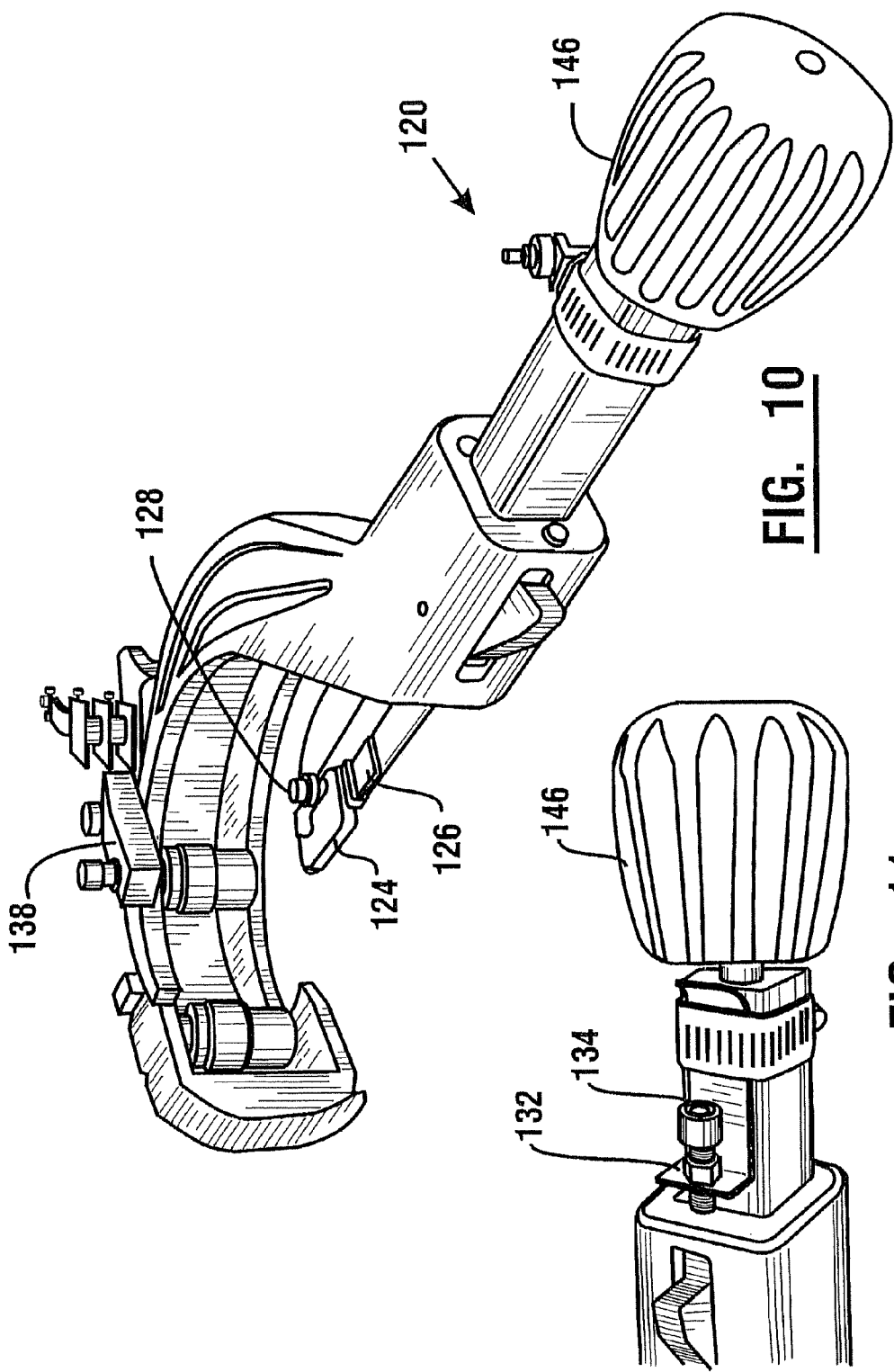
FIG. 10 is a perspective view of a grooving tool.
FIG. 11 is a partial view of the grooving tool of FIG. 10 showing a tension/depth guide.
Figures 12, 13:
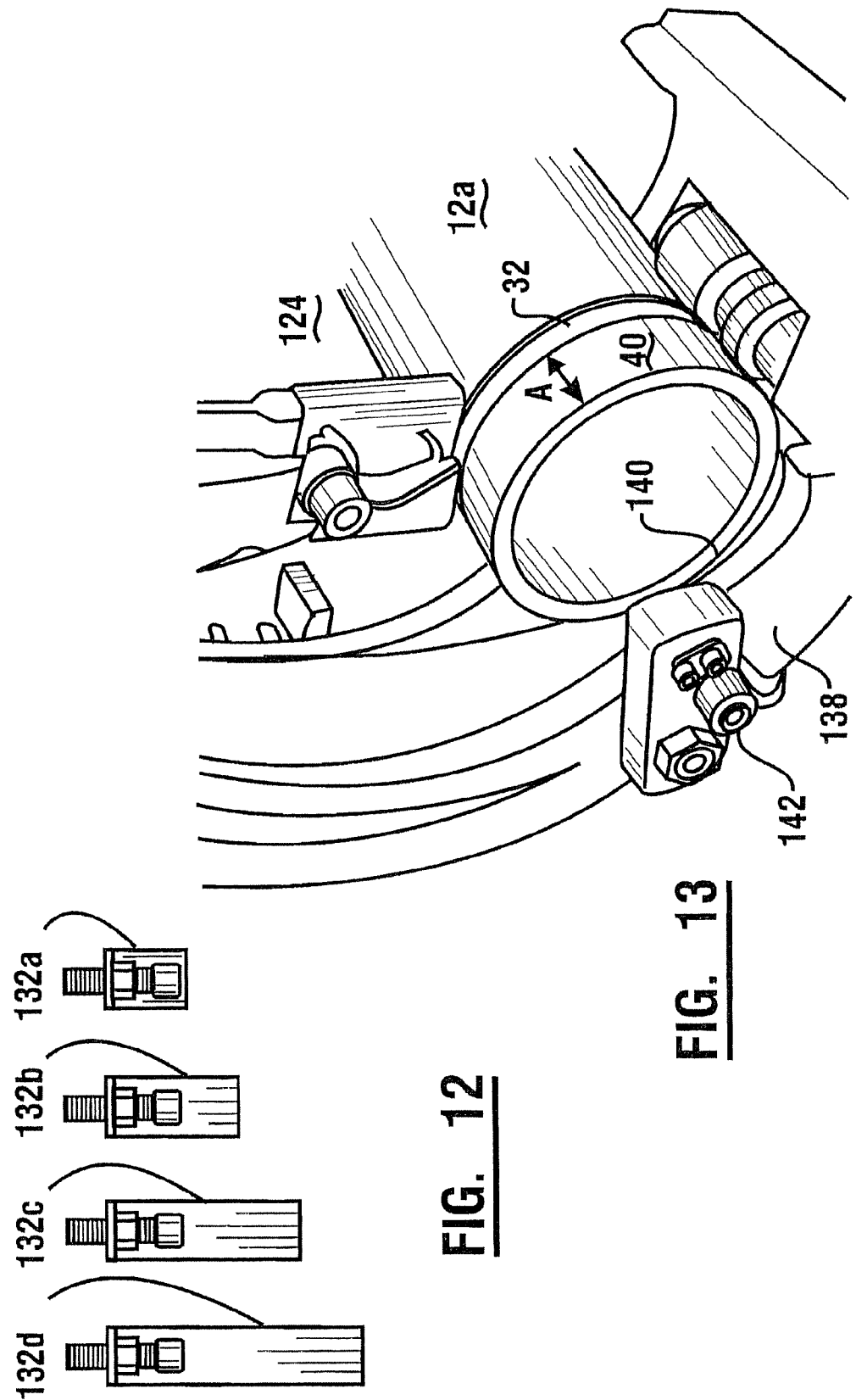
FIG. 12 is a front view of a family of tension/depth guides.
FIG. 13 is a partial perspective view of the grooving tool of FIG. 10 and a grooved pipe length.

With reference again to FIG. 1, the exemplary system 10 includes at least one vertical riser 12e formed of CPVC material. Particularly, the exemplary system provides a CPVC vertical riser 12e wherein the pipe diameter is greater than 2≅, and preferably 4" or more. With reference to FIG. 9, support device 30 includes a pair of substantially identical band elements 120. Each band element 120 includes an arcuate section 122 adapted to embrace the wall of the riser 12e throughout nearly 180 E. Each band element 120 further includes a flange portion 124 having a generally planar flange surface 126 extending in perpendicular relationship from a first end of arcuate section 122. Flange surface 126 has an opening therethrough for reception of a mechanical fastener 128. Arm extension 132 comprises a generally planar surface 134 extending in perpendicular relationship from the second end of arcuate section 122. Arm extension also includes an opening therethrough for reception of a mechanical fastener 128. Arm extension 132 is adapted for connection with structural members to stabilize vertical riser 12e. The exemplary support device 30 is formed of metal in an exemplary embodiment, but in other embodiments other materials may be used.

Use of larger diameter CPVC pipe lengths, such as riser 12e, presents unique challenges for the pipe and support assembly. For example, the pipe length must be supported without over-compression of the pipe wall. Thus, compression tolerances must be considered in the construction of the mechanical fixture. Also, material expansion and contraction must be taken into account. Further, the exemplary system 10 is contemplated for use in a continuously pressurized wet fire sprinkler system.

When the support device 30 is assembled and in operative condition supporting the riser, the flange surface 126 of one element is adapted to abut the flange surface 126 of the other opposed element. Likewise, the arm extension planar surface 134 of one element is adapted to abut the arm extension planar surface 134 of the other opposed element. This arrangement acts as a compression-limiting mechanism to prevent compression of the CPVC riser beyond predetermined compression limits.

An exemplary method includes forming a system of pipe lengths 12 in fluid flow communication, wherein the pipe lengths are formed of a CPVC composition. In forming the system, at least one pair of pipe lengths 12a, 12b is sealingly engaged in close end-to-end relationship without the use of solvent cement. Instead, the at least one pair of pipe lengths is reversibly and releasably sealingly engaged with a first type of mechanical fixture or coupling device 16.

In an exemplary method, at least one main pipe length 12c and at least one branch pipe 12d are sealingly engaged in close perpendicular relationship at a branch location without the use of solvent cement. The main pipe length and the branch pipe are reversibly and releasably engaged with a second type of mechanical fixture or branching device 24.

An exemplary method includes subjecting a first pipe fitting assembly comprising the pair of pipe lengths and the coupling device to a testing protocol. A second pipe fitting assembly comprising the main pipe length, the branch pipe, and the branching device is also subjected to a testing protocol.

In an exemplary method, the step of sealingly engaging the pair of pipe lengths includes forming a continuous annular groove 32, 34 in a pipe wall of each of the pipe lengths 12a, 12b a predetermined distance from an end thereof. A resilient annular seal 46, formed of a material chemically compatible with the CPVC pipe, is positioned onto sealing surfaces 40, 42 located between each respective groove and pipe end. Thereafter, a pair of coupling segments is positioned about the annular seal such that the seal is seated in an interior longitudinal channel 62 of each coupling segment which forms the interior circumferential region 70.

With reference to FIGS. 10-13 in an exemplary embodiment a pipe groove 32 is formed using a grooving tool 120. The end of the pipe of the embodiment is preferably cut square so that a sealing surface at the end of the pipe may be formed according to controlling specifications.

A cutting blade 124 is selected based on the pipe diameter. For example, in the exemplary method, for pipes in sizes 2 to 3 inches in diameter a blade is used with a width of about 0.312 inches. For a pipe with a 4-inch diameter a blade with a width of about 0.375 inches may be used. The blades cut a groove of substantially corresponding width into the thickness of the pipe wall. Of course this approach is exemplary.

The blade 124 is supported by a top support 126 to prevent the blade from moving front to back. Bushings 128 are installed to prevent the blade from moving side to side. In the exemplary method, bushings are used on both sides of the blade for the 0.312 inch blade. For the 0.375 inch blade, a bushing is used on only one side (the "A" side) of the blade. In that way, the blade can be readily changed without making an adjustment to the cutting guide for the "A" dimension as detailed below.

In the exemplary method, a tension/depth guide 132 is utilized to limit the tension and depth of the groove 32 formed in the pipe wall. The exemplary tension/depth guide may be adjusted as needed. A locking nut 134 is installed to keep the setting constant. In the exemplary method, interchangeable tension/depth guides 132a, 132b, 132c, 132d are provided and a selection is made according to pipe size.

In the exemplary method, a cutting guide 138, aligned with the edge 140 of the pipe, is utilized to maintain the proper size of the longitudinal sealing surface 40 adjacent the end of the pipe. The distance from the groove 32 to the pipe edge 140 is termed the "A" dimension which is the width of the sealing surface 40. In the exemplary embodiment the cutting guide 138 can be adjusted as needed. A locking nut 142 is installed to maintain the setting of the cutting guide. The groove walls which extend generally perpendicular to the annular outer surface of the pipe can be straight cut, or radiused in some embodiments.

With the pipe length 12a properly positioned, the outer pipe wall is engaged with the blade 124 by rotation of tensioning handle 146. The grooving tool 120 is then rotated relative to the pipe with the cutting blade 124 removing pipe material. The tensioning handle is rotated so material is removed on each subsequent pass. The process continues until no further pipe material is removed due to action of the tension depth guide. As the grooving tool is rotated, the cutting guide 138 should be monitored to ensure that the pipe edge 140 is riding along the cutting guide to maintain the proper width for sealing surface 40.

After the initial groove is formed, the groove diameter is measured to verify that the groove diameter is within specifications. If necessary, the tension/depth guide 132 is adjusted, and the grooving process repeated. The "A" dimension is measured to verify that the sealing surface 40 is within specifications. The cutting guide 138 is adjusted if required and the grooving process repeated.

In an exemplary method, the step of sealingly engaging the main pipe length 12c with the branch pipe 12d includes forming an orifice 76 in the main pipe length at a branch location. The pipe wall of the main pipe length is embraced with a branching device 24 comprising first and second arcuate sections 80, 82 such that a sealing member 78 carried in a sealing recess 94 in a first arcuate section compressively engages the main pipe length about the orifice.

In the exemplary method, a branch cutting tool (not shown) is utilized to cut the orifice in the main pipe length at the branch location. The exemplary branch cutting tool is able to retain the cut-out coupon so that it does not enter the main pipe length.

UL Testing For Mechanical Connectors:

One objective of the exemplary embodiments disclosed herein is that the pipe and mechanical fixture assemblies will be able to meet or exceed UL testing requirements for use in fire sprinkler systems. A few of the tests to which the pipe fitting assemblies would be subjected are briefly described below.

Fire Exposure Test (UL 1821, Sec 13)

Representative pipe and fitting assemblies for ceiling pendent, upright, and sidewall pendent shall be tested.

Exposed pipe and fitting assemblies:
a) shall not burn, separate, or leak; and
b) shall maintain the sprinkler in the intended operating position.

Following the fire exposure, the pipe and fitting assemblies shall withstand an internal hydrostatic pressure equal to the maximum rated pressure for 5 minutes without rupture or leaks.

Bending Moment Tests (UL 213, Sec. 12):

Testing will be conducted with all sizes of tees and crosses which include a threaded outlet connection except ½ and ¾ in. outlets.

The fitting and pipe joint assembly shall not leak or rupture when subjected to the specified bending moment. During the tests the assembly is to be pressurized to rated pressure.

The required bending moment is calculated based on twice the weight of water filled pipe over twice the maximum distance between pipe supports specified in the Standard for Installation of Sprinkler Systems, ANSI/NFPA 13.

| CPVC BENDING MOMENTS | | | |
| --- | --- | --- | --- |
| Pipe Size | H2O filled (lbs/ft) | Hanger (feet) | Moment (ft-lbs) |
| 1" | 0.675 | 6 | 24.3 |
| 1¼" | 1.079 | 6.5 | 45.6 |
| 1½" | 1.417 | 7 | 69.6 |
| 2 | 2.224 | 8 | 142.3 |
| 2½" | 3.255 | 9 | 263.7 |
| 3 | 4.829 | 10 | 482.9 |

With the assembly support at point located at least 12 inches (305 mm) on either side of the center of the coupling, a gradually increasing force is to be applied to the center of the coupling until the required bending moment is achieved.

Vibration Test (UL 1821, Sec. 19)

Testing will be conducted with 2×1 threaded outlet and 2×1¼ inch grooved outlet tees and 2½×1 threaded outlet, 2½×1¼ grooved outlet, 3×1½ inch threaded and grooved crosses. The 2½ inch cross will have a 1 inch threaded outlet on one side and a 1¼ inch grooved outlet on the other side. The 3 inch cross will have a 1½ inch threaded outlet on one side and a 1½ inch grooved outlet on the other side.

Pipe and fitting assemblies shall withstand the effects of vibration for 30 hours without deterioration of performance characteristics. Following the vibration test, each test assembly shall comply with the specified requirements in the Hydrostatic Pressure Test.

Assembly Test (UL 1821, Sec. 22)

Testing will be conducted with all combinations of pipe size and hole size for both tees and crosses.

Samples shall withstand for 2 hours, without rupture, separation, or leakage, an internal hydrostatic pressure equivalent to the rated pressure or higher, as specified in the installation and design manual, and other internal hydrostatic pressures as they relate to cure times specified in the installation and design manual.

Hydrostatic Pressure Test (UL 1821, Sec. 23)

Testing will be conducted with all combinations of pipe size and hole size for both tees and crosses.

Representative pipe and fitting assemblies shall withstand for 1 minute, without rupture, separation, or leakage, an internal hydrostatic pressure of five times the rated pressure.

Pressure Cycling Test (UL 1821, Sec. 24)

Testing will be conducted with all combinations of pipe size and hole size for both tees and crosses.

Representative pipe and fitting assemblies shall withstand without leakage, separation, or rupture 3000 pressure cycles from zero to twice the rated pressure of the pipe and fittings. After the cycling, the pipe and fitting assemblies shall comply with the Hydrostatic Pressure Test.

Temperature Cycling Test (UL 1821, Sec. 25)

Testing will be conducted with all combinations of pipe size and hole size for both tees and crosses.

Representative pipe and fitting assemblies shall comply with the Hydrostatic Pressure Test after being subjected to temperature cycling from 35° F. (1.7° C.) to the maximum rated temperature. The pipe and fitting assemblies are to be filled with water, vented of air, hydrostatically pressurized to 50 psig (345 kPa), and subjected to temperature cycles of 35 EF (1.7 EC) to the maximum rated temperature to 35 EF. Each assembly is to be held at each temperature specified for a period of 24 hours. A total of 5 complete cycles are to be completed.

Long Term Hydrostatic Pressure Test (UL 1821, Sec. 27)

Testing will be conducted with all combinations of pipe size and hole size for both tees and crosses.

The pipe and fitting assemblies shall withstand without rupture, leakage, or joint separation the hoop stress specified below, applied to the assembly for 1000 hours, at the maximum rated temperature:

| Type | Standard dimension ratio | Required hoop stress, psi (Mpa) |
| --- | --- | --- |
| CPVC | 13.5 | 2310 (15.93) |

During and after exposure, the pipe and fitting assemblies are to be examined for evidence of rupture, leakage, or joint separation.

Thus, the exemplary apparatus and processes for forming a network of CPVC pipe lengths achieve one or more of the above stated objectives.

In the foregoing description, certain terms have been used for brevity, clarity and understanding, however, no unnecessary limitations are to be implied therefrom, because such terms are used for descriptive purposes and are intended to be broadly construed. Moreover, the descriptions and illustrations herein are by way of examples and the invention is not limited to the exact details shown and described.

In the following claims, any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

What is claimed is:

1. A system comprising:
a plurality of fluid pipe lengths in flow communication formed from a CPVC composition;
a first type of mechanical fixture, wherein the first type of mechanical fixture comprises a coupling device operative to sealingly engage at least one pair of the plurality of pipe lengths in close end to end relationship without the use of solvent cement; and
wherein the coupling device includes a resilient annular seal comprised of a material chemically compatible with the CPVC composition, and wherein each of the pipe lengths of the at least one pair includes a continuous annular groove formed in the pipe wall at a predetermined distance from an end thereof, wherein the portion of the pipe wall on each pipe length between the pipe end and the groove comprises a sealing surface, and wherein the resilient annular seal is engaged with the sealing surfaces of the one pair of grooved pipe lengths; and
wherein the coupling device comprises:
a pair of coupling segments, wherein each coupling segment comprises an arcuate body having a first end, a second end, an interior concave surface extending between the first end and the second end, and a longitudinal channel extending along the concave surface; and
at least one mechanical fastener operative to detachably connect the pair of coupling segments;
wherein when the coupling device is assembled, the resilient annular seal extends within the longitudinal channel of each segment;
a second type of mechanical fixture, wherein the second type of mechanical fixture comprises a branching device operative to sealingly engage a main pipe length and a branch pipe length in close perpendicular relationship at a branch location without the use of solvent cement, wherein the pipe wall of the main pipe length includes an orifice therethrough at the branch location; and
wherein the branching device includes a resilient sealing member comprised of a material chemically compatible with the CPVC composition, and wherein a sealing surface of the resilient sealing member is engaged with the main pipe length in a sealing area immediately about the orifice.

2. The system of claim 1 wherein the branching device includes:
opposed first and second arcuate sections defining a cylindrical space therebetween embracing the pipe wall of the main pipe length, the first arcuate section including a concave saddle surface generally corresponding to the outer circumference of the main pipe length, a branch pipe opening dimensioned to overlay the orifice, a spigot wall surrounding the branch pipe opening wherein the spigot wall includes a contoured lip, and a sealing recess encircling the spigot wall wherein the sealing recess is open at the saddle surface; and
at least one mechanical fastener operative to detachably connect the opposed arcuate sections;
wherein the resilient sealing member is seated within the sealing recess.

3. The system of claim 2 wherein the resilient sealing member includes at least one key projection and the sealing recess includes at least one cooperating key recess operative to orient the resilient sealing member within the sealing recess.

4. The system of claim 3 wherein each arcuate segment of the coupling device includes limiting surfaces operative as a compression-limiting mechanism to prevent over-compression of each of the pair of CPVC pipe lengths.

5. The system of claim 4 wherein the first and second arcuate sections of the branching device include limiting surfaces operative as a compression-limiting mechanism to prevent over-compression of the CPVC main pipe length.

6. The system of claim 5 wherein, when assembled, the coupling device and the at least one pair of pipe lengths comprise a first pipe fitting assembly, wherein the first pipe fitting assembly is operative to pass a first predetermined testing protocol.

7. The system of claim 6 wherein, when assembled, the branching device, the main pipe length, and the branch pipe length comprise a second pipe fitting assembly, wherein the second pipe fitting assembly is operative to pass a second predetermined testing protocol.

8. The system of claim 7 wherein the plurality of fluid pipe lengths includes at least one vertical riser formed of CPVC composition, and wherein the system further comprises:
a third type of mechanical fixture, wherein the third type of mechanical fixture comprises a support device operative to supportingly engage the at least one vertical riser, wherein the support device comprises a pair of substantially identical band elements, wherein each band element includes an arcuate section operative to embrace the wall of the riser throughout nearly 180 E, a flange having a generally planar flange surface having an opening therethrough for reception of a mechanical fastener extending from a first end of the arcuate section, and an arm extension disposed at the other end of the arcuate section, the arm extension including an opening therethrough for reception of another mechanical fastener, wherein, when assembled, the flange surface and the arm extension of opposed band elements are operative as a compression-limiting mechanism to prevent compression of the CPVC riser beyond predetermined compression limits.

9. The system of claim 8 wherein the vertical riser pipe length has a diameter of between about 2 inches and about 4 inches.

10. The system of claim 9 wherein the second arcuate section of the branching device is substantially similar in construction to the first arcuate section, wherein the branch device is operative to sealingly engage the main pipe length and a second branch pipe length in close perpendicular relationship at a second branch location, wherein the pipe wall of the main pipe length includes a second orifice therethrough at the second branch location diametrically opposed to the first branch location.

11. The system of claim 10 operative under a continuous pressure of at least about 375 psig @ 150° F. for 1000 hours without fluid leakage.

12. The system of claim 11 further comprising:
a plurality of fire sprinkler heads in flow communication with the plurality of fluid pipe lengths.

13. A method comprising:
a) forming a system of pipe lengths in flow communication, wherein the pipe lengths are formed of a CPVC composition, including:

i) reversibly sealingly engaging at least one pair of pipe lengths in close end to end relationship with a first type of mechanical fixture without the use of solvent cement; and ii) reversibly sealingly engaging at least one main pipe length comprising a CPVC composition in close perpendicular relationship with at least one branch pipe length at a branch location with a second type of mechanical fixture without the use of solvent cement; and b) subjecting at least one first pipe fitting assembly comprising the at least one pair of pipe lengths and the first type of mechanical fixture to a first predetermined testing protocol: and c) subjecting at least a second pipe fitting assembly comprising the at least one main pipe length, the at least one branch pipe, and the second type of mechanical fixture to a second predetermined testing protocol.

14. The method of claim 13 wherein in (a)(i) sealingly engaging the at least one pair of pipe lengths includes:

forming a continuous annular groove in a pipe wall of each of the pipe lengths a predetermined distance from a respective end thereof, wherein a portion of the pipe wall on each pipe length between the pipe end and the groove comprises a sealing surface;

positioning a resilient annular seal onto the sealing surfaces of one adjacent pair of grooved pipe lengths, wherein the resilient annular seal comprises material chemically compatible with the CPVC composition; and positioning a pair of coupling segments about the resilient annular seal such that the seal is seated in a longitudinal channel of each coupling segment.

15. The method of claim 14 wherein in (a)(ii) sealingly engaging the at least one main pipe length with the branch pipe length includes:

forming an orifice in the main pipe length at the branch location;

embracing the pipe wall of the main pipe length at the branch location with a branching device, wherein the branching device includes:

a first arcuate section, wherein the first arcuate section includes a concave saddle surface generally corresponding to the outer circumference of the main pipe length, a branch pipe opening dimensioned to extend in the orifice, a spigot wall surrounding the branch pipe opening wherein the spigot wall terminates inwardly at a contoured lip generally corresponding to the saddle surface contour, and a sealing recess encircling the spigot wall wherein the sealing recess is open at the saddle wall and terminates in the direction of the branch pipe;

a second arcuate section having a surface operative to embrace the main pipe length;

a resilient sealing member positioned in the sealing recess, wherein the sealing member is annularly engaged with the pipe length about the orifice, and wherein the resilient sealing member is chemically compatible with the CPVC piping; and at least one mechanical fastener operative to engage the first arcuate section with the second arcuate section; and receiving a branch pipe length in the branch pipe opening.

16. The method of claim 15 wherein in (a) forming the system of pipe lengths further comprises:

iii) supporting a vertical riser formed of a CPVC composition with a third type of mechanical fixture, wherein the vertical riser is in flow communication with the at least one main pipe length.

17. A method comprising:

a) taking a region of a fire sprinkler system off-line, wherein the fire sprinkler system comprises a network of existing pipe lengths comprising CPVC;

b) modifying the fire sprinkler system by connecting at least one additional pipe length comprising CPVC in flow communication with at least a portion of an existing pipe length using at least one mechanical fixture; wherein modifying the fire sprinkler system includes replacing a section of the existing pipe length by:

(b)(i) square cutting the existing pipe length to remove the section to be replaced and to provide at least a first pipe end;

(b)(ii) cutting an annular groove in the pipe wall of the existing pipe length a predetermined distance form the pipe end;

(b)(iii) providing a second pipe length having an annular groove in the pipe wall a predetermined distance from an end thereof;

(b)(iv) sealingly engaging the existing pipe length and the second pipe length in close end to end relationship with the at least one mechanical fixture, wherein the at least one mechanical fixture is a coupling device; and further modifying the fire sprinkler system by providing a branch pipe line by:

(b)(v) cutting an orifice in a main pipe length at a branch location;

(b)(vi) encasing the main pipe length with the at least one mechanical fixture at the branch location, wherein the mechanical fixture is a branching device operative to sealingly engage the main pipe length about the orifice; and (b)(vii) receiving a branch pipe length into an outlet opening in the mechanical branching fixture, wherein the branch pipe length is disposed substantially perpendicularly to the main pipe length; and c) returning the region of the fire sprinkler system to an on-line condition.

* * * * *